United States Patent
Lepage et al.

(10) Patent No.: US 12,226,870 B2
(45) Date of Patent: Feb. 18, 2025

(54) APPLICATION DEVICE AND METHOD TO CLEAN GRINDING SURFACES IN A MACHINE FOR GRINDING OPHTHALMIC LENSES

(71) Applicant: Essilor International, Charenton-le-Pont (FR)

(72) Inventors: Jean-Etienne Lepage, Charenton-le-Pont (FR); Sebastien Pinault, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 1402 days.

(21) Appl. No.: 16/624,427

(22) PCT Filed: Jun. 29, 2018

(86) PCT No.: PCT/EP2018/067677
§ 371 (c)(1),
(2) Date: Dec. 19, 2019

(87) PCT Pub. No.: WO2019/002591
PCT Pub. Date: Jan. 3, 2019

(65) Prior Publication Data
US 2020/0130125 A1 Apr. 30, 2020

(30) Foreign Application Priority Data

Jun. 30, 2017 (EP) ..................................... 17305828

(51) Int. Cl.
B24B 13/00 (2006.01)
B24B 9/14 (2006.01)
(Continued)

(52) U.S. Cl.
CPC .......... B24B 13/0037 (2013.01); B24B 9/146 (2013.01); G02C 7/022 (2013.01); *B24B 53/007* (2013.01)

(58) Field of Classification Search
CPC ........... B08B 1/00; B08B 1/001; B08B 1/003; B08B 1/006; B08B 1/04; B08B 3/04;
(Continued)

(56) References Cited

U.S. PATENT DOCUMENTS 3,256,647 A * 6/1966 Norman ................ B24B 53/007
D15/126
4,596,091 A 6/1986 Daboudet et al.
5,643,052 A * 7/1997 Delattre ................ B23Q 41/00
451/21

FOREIGN PATENT DOCUMENTS

DE 637663 C * 11/1936 ............. B24D 13/12
DE 40 12 658 A1 9/1991
(Continued)

OTHER PUBLICATIONS

DE4012658—Machine Translation (Year: 1991).*
(Continued)

*Primary Examiner* — Brian D Keller
*Assistant Examiner* — Alberto Saenz
(74) *Attorney, Agent, or Firm* — NIXON & VANDERHYE

(57) ABSTRACT

An application device is configured to clean grinding surfaces in a machine for grinding ophthalmic lenses, the application device including: a central portion having so as to mount the application device in the grinding machine; and a peripheral edge configured to receive an application surface to cooperate with the grinding surface of the grinding wheel so as to clean the grinding surface. It also relates to
(Continued)

a cleaning kit including an application device and a cleaning solution, and to a method for cleaning grinding surfaces.

6 Claims, 3 Drawing Sheets

(51) Int. Cl.
*G02C 7/02* (2006.01)
*B24B 53/007* (2006.01)

(58) Field of Classification Search
CPC ..... B24B 53/007; B24B 53/095; B24B 53/04; B24B 53/053; B24B 53/14; B24B 53/005; B24B 9/146; B24B 55/02; B24B 55/12; H01L 21/67046
USPC ..... 451/42, 47, 72, 443, 444; 134/99.1, 144, 134/147, 148, 153, 157, 184, 185, 201, 134/186; 118/320; 401/183, 184, 185, 401/186

See application file for complete search history.

(56) References Cited

FOREIGN PATENT DOCUMENTS

| | | | | |
|---|---|---|---|---|
| DE | 4012658 A | * | 9/1991 | ............. B24B 53/04 |
| FR | 2 543 039 A1 | | 9/1984 | |
| FR | 2949369 A1 | * | 8/2009 | ............... B24B 9/14 |

OTHER PUBLICATIONS

DE637663—Machine Translation (Year: 1936).*
FR2949369—Machine Translation (Year: 2009).*
International Search Report and Written Opinion, dated Jul. 25, 2018, from corresponding/related PCT Application No. PCT/EP2018/067677.

* cited by examiner

APPLICATION DEVICE AND METHOD TO CLEAN GRINDING SURFACES IN A MACHINE FOR GRINDING OPHTHALMIC LENSES

FIELD OF THE INVENTION

The present application relates to an application device for cleaning and renewing grinding surfaces. The device is particularly suitable for cleaning and renewing the surface of grinding wheels mounted in a machine that is configured to grind ophthalmic lenses. The invention also relates to a cleaning kit comprising such an application device and a cleaning solution, as well as to a method for cleaning and renewing grinding surfaces.

BACKGROUND OF THE INVENTION

Grinding machines are used in the ophthalmic field for trimming, beveling, grooving and polishing ophthalmic lenses.

A trimming operation consists in adapting the generally circular contour of an ophthalmic lens to the contour of the frame designed to receive it. It consequently consists in removing part of the material of the periphery of the lens.

Beveling of an ophthalmic lens, which is carried out after trimming, enables the cross-section of the peripheral edge of the lens to be adapted so that it fits into the groove which the spectacle frame usually incorporates. Beveling of the lens consists consequently in providing a generally triangular-shaped bevel or rib on the peripheral edge of the lens.

A grooving operation on an ophthalmic lens may also be carried out on a lens after it has been trimmed. This enables the cross-section of the peripheral edge of the lens to be adapted so that it can be mounted in certain types of frames.

A polishing operation of an ophthalmic lens consists in making the surface of the ophthalmic lens smooth and shiny by rubbing it.

Most frequently, these different operations are carried out on a single grinding machine, fitted with a train of grinding wheels. Such machines are known and available commercially.

Grinding machines of this type typically comprise one or several diamond grinding wheels frequently coupled together to constitute a train of grinding wheels that are rotatably mounted around a first axis, gripping members designed to receive the ophthalmic lens to be machined so as to rotate it around a second axis, and control means. The control means are designed to control the rotation of the grinding wheels and the gripping members which hold the lens respectively around the first and second axes; the control means additionally control the relative displacement between the lens and the grinding wheels.

Such machines and their operation are more particularly described in French patent number 2 543 039 in the name of the present applicant.

Known grinding machines and more particularly the one described in said patent operate in a highly satisfactory manner. They however do not provide a satisfactory solution to the problem of wear of the grinding wheels, and in particular to the problem of wear of the grinding surface of the grinding wheels.

On such grinding machines, diamond grinding wheels are usually used. These generally consist of a disk, the periphery of which is covered with layer consisting of a binder incorporating fine diamond particles. During repeated machining operation on lenses by the grinding machines, the grinding wheel surface becomes progressively duller and loses its abrasive power. The loss is due to the diamond particles in contact with the lens to be machined gradually getting worn down. It can also come from the oxidation of said particles. It is obvious that although the phenomenon is described for the case of diamond grinding wheels, it also occurs with other types of grinding wheels.

Manual renewal of grinding wheel surfaces exist. When the operator considers that wheel is blunt, he opens or removes the protective hood of the grinding machine and employs a stick of alumina or carborundum or a material of similar hardness which he passes manually over the wheel surface to renew it. There are many disadvantages associated with this procedure:

Firstly, it leads to premature wear of the diamond surface when the resharpening operations are repeated frequently, or when the operator performs the operation too brutally. Even if the grinding wheel is still working, the operator may judge that machining is not proceeding fast enough and decide to renew the grinding wheel surface prematurely. This, bearing in mind the high cost of the grounding wheel, is a major disadvantage;

Secondly, the manual procedure, and despite all the experience the operator may have, causes deformation of the periphery of the grinding wheel. In the case of a trimming wheel, with a flat peripheral cross-section, the alumina or carborundum stick must be held exactly parallel to the edge of the wheel to avoid deforming its profile. The operation is very difficult to carry out in a satisfactory way. In the case of a bevelling or grooving wheel which has a projecting or recessed profile, manual resharpening using an alumina or carborundum stick causes appreciable deformation of the machining profile of the grinding wheel. Because of this, after resharpening, the wheel no longer has a suitable shape to ensure completely satisfactory machining;

Thirdly, since manual renewal requires from the operator to open the grinding machine, and in particular to remove or at least to open its protective hood, this can lead to elements projecting in the space surrounding the machine, which is not satisfactory for the cleanness of the space surrounding the grinding machine and can jeopardize the security of the persons evolving in the area of the machine.

Therefore, there is still a need to provide a device to clean and renew grinding surfaces in a grinding machine in an efficient, secure and clean manner.

SUMMARY OF THE INVENTION

One aim of the present invention is to overcome at least one of the drawbacks of the prior art.

By cleaning of the grinding surface is meant any operation consisting in removing material disposed on the grinding surface and that jeopardizes the efficiency of the grinding.

To this aim, the present invention provides an application device comprising a central portion having coupling means configured to cooperate with the gripping members of the grinding machine so as to mount the application device in the grinding machine, the application device further comprising a peripheral edge configured to receive an application surface to cooperate with the grinding surface of the grinding wheel so as to clean the grinding surface.

Thus, the grinding surface can be cleaned and/or renewed with the protective hood of the machine being closed. It can also be easily used by the operator. Moreover, the use of the application surface does not risk to prematurely wear the grinding surface of the grinding wheel to be cleaned.

Other optional and non-limiting features of the application device are as follows:

- The application surface is designed to apply a cleaning solution on the grinding surface;
- The application device comprises a tank that is configured to contain some cleaning solution and delivery means that are configured to deliver the cleaning solution to the application surface;
- The tank is squeezable;
- It comprises delivering channels that are arranged in the peripheral edge of the application device;
- It comprises a disk mounted on the peripheral edge so as to constitute an application surface;
- The disk is made of felt;
- The disk presents a Young modulus smaller than the Young modulus of the central portion;
- The grinding surface has a peripheral groove and the application surface has a rib that is configured to cooperate with the peripheral groove of the grinding surface.

The present invention also provides a cleaning kit comprising an application device according to the present invention and a cleaning solution.

The present invention also provides a method for cleaning grinding surfaces in a machine for grinding ophthalmic lenses, the method comprising the step of providing an application device having an application surface that is dimensioned so as to fit with the grinding surface, the step of mounting the application device to the gripping members, and the step of actuating the control means so that the grinding wheel is rotated around the first axis and the application surface and the grinding surface come into contact, so as to clean the grinding surface.

Other optional and non-limiting features of the method are as follows:

- The control means are further designed to control the rotation around a second axis of the assembly consisting of the gripping members and the ophthalmic lens when an ophthalmic lens is received in the gripping members, the method further comprising actuating the control means so that the assembly consisting of the gripping members and the application device is rotated around the second axis, so as to clean the grinding surface;
- The method further comprises actuating the control means so that the application surface and the grinding surface come into contact prior to the providing of a cleaning solution on the application surface;
- The method further comprises injecting a rinsing solution in the machine so as to rinse the machine after the cleaning of the grinding surface.

DESCRIPTION OF THE DRAWINGS

For a more complete understanding of the description provided herein and the advantages thereof, reference is now made to the brief descriptions below taken in connection with the accompanying drawings and detailed description, wherein like reference numerals represent like parts.

DETAILED DESCRIPTION OF THE INVENTION

Figure 1:
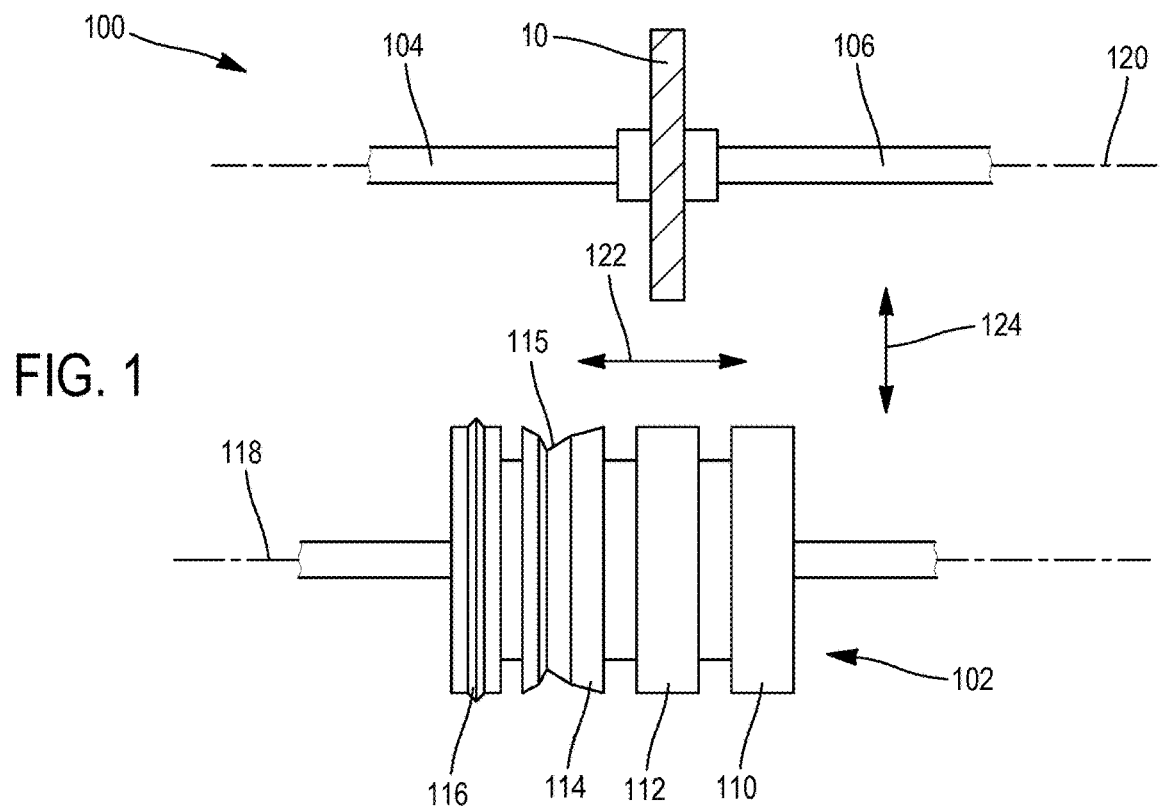
FIG. 1 is a diagrammatical view of the lens grinding machine.

In the description which follows the drawing figures are not necessarily to scale and certain features may be shown in generalized or schematic form in the interest of clarity and conciseness of for informational purposes.

In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

FIG. 1 is a diagrammatical view of a machine 100 for grinding lenses; only those parts directly concerned by the present invention are shown in FIG. 1. Such a machine comprises, in a manner known per se, a set 102 of diamond grinding wheels, gripping members 104, 106 designed to receive an ophthalmic lens and control means (not represented) for controlling the rotation and the relative position of said grinding wheels and said lens. Only one train of grinding wheels has been shown on FIG. 1 and this for example consists of four grinding wheels grouped together consisting of a wheel for trimming 110, a wheel for polishing 112, a grooved wheel 114 for finishing and beveling, and a ribbed wheel 116 for finishing and grooving. The set of wheels 102 is designed to rotate on a first axis 118 driven by a motor which is not shown, controlled by the control means. The gripping members 104, 106 consist, for example in FIG. 1, in two carrier spindles designed to clamp a lens. The machine further comprises a protective hood (not represented) that is configured to separate the set of the wheels 102 and the lens mounted in the machine from the space surrounding the machine 100. In FIG. 1, the situation in which an application device 10 according to the present invention is mounted in the gripping members 104, 106 in place of the lens is illustrated. The complete assembly consisting of the gripping members 104, 106 and the lens or the application device 10 provided in its place is designed to rotate about a second axis 120, driven by a motor, not shown, controlled by the control means. The control means thus control the rotation of the grinding wheel train 102 about the first axis 118, and rotation of the complete assembly consisting of the gripping members 104, 106 and the application device 10 about the second axis 120. The control means further control relative displacement of the train of grinding wheels and of the assembly in the direction of the first and second axes as indicated by arrow 122 on FIG. 1, and in the direction perpendicular to the first and second axes as indicated in FIG. 1 by the arrow 124. The application device 10 with a generally plane peripheral section has been shown in FIG. 1, this device being suitable for renewing the surface of grinding wheels.

The control means have not been shown in FIG. 1 as their exact manner of operation is not in any way essential to a full understanding of the invention. Conventionally, they can comprise a sensing finger provided with a sensing probe or any other suitable measuring device. The control means may include a specific program ensuring good surface renewal, and which is for example stored in the machine 100 in a support. In fact, the invention can be adapted to all type of automatic grinding machine having widely varying control and gripping means.

Figure 2:
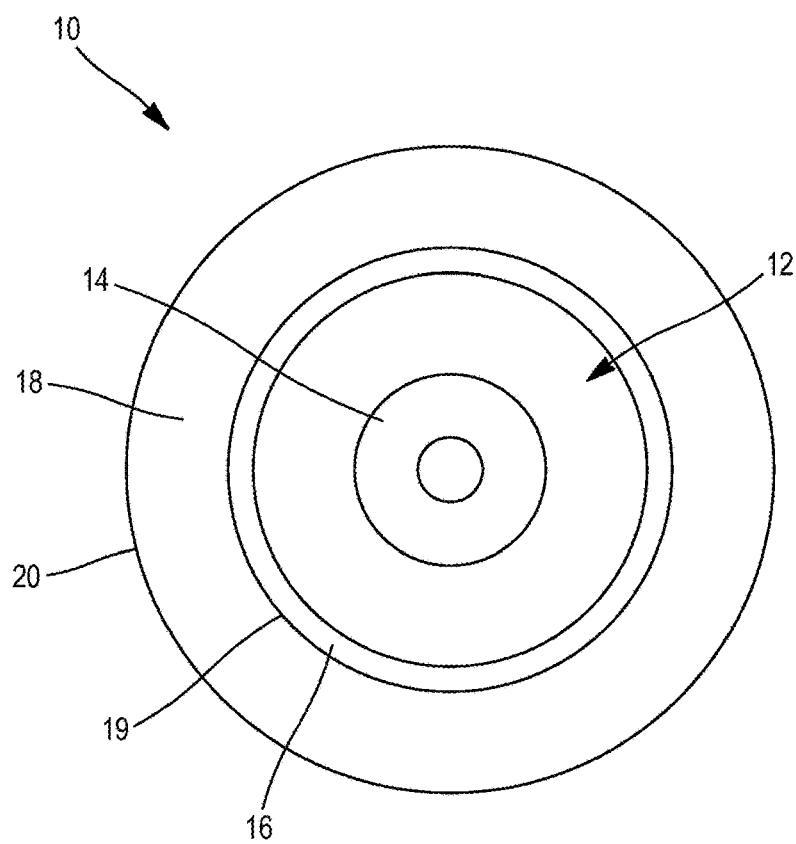
FIG. 2 shows a first embodiment of the application device according to the present invention.
Figure 3:
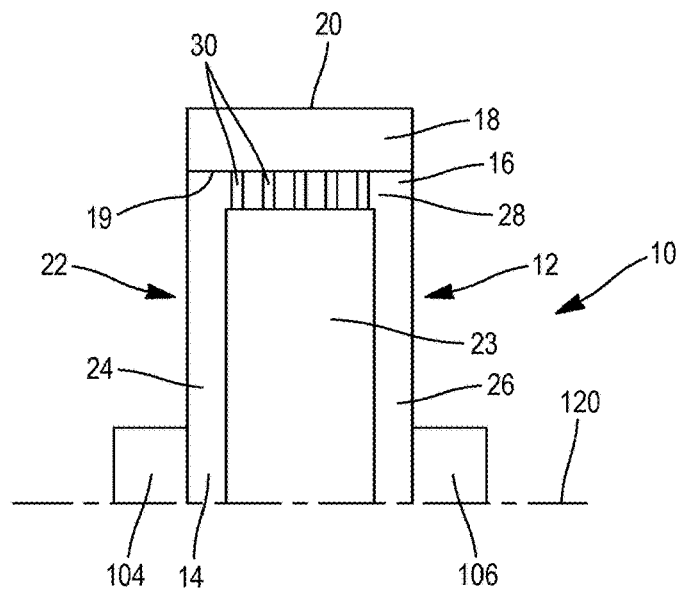
FIGS. 3 and 4 represent a partial cross-section of the first embodiment of the application device.
Figure 4:
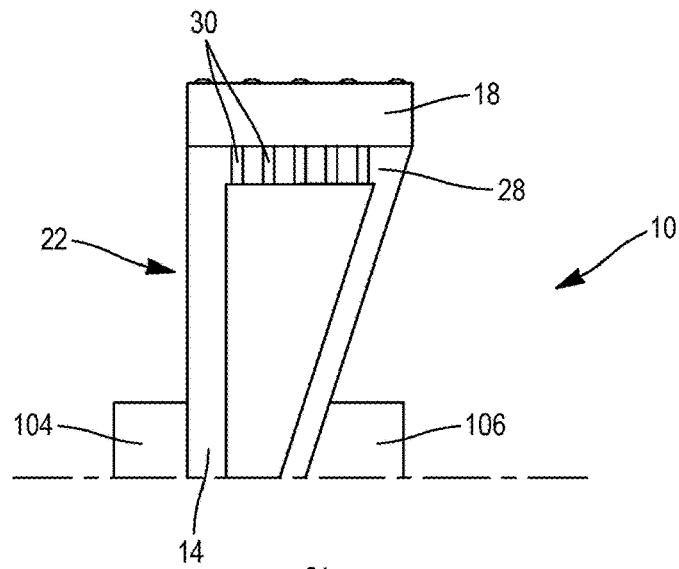

FIGS. 2, 3 and 4 show a first embodiment of an application device 10 according to the present invention. The application device 10 has a central portion 12 comprising coupling means 14 that are configured to cooperate with the gripping members 104, 106 of the machine 100 so as to mount the application 10 in the machine 100 and to make it rotate around the second axis 120.

The application device 10 further comprises a peripheral edge 16 that is configured to receive a disk 18 consisting of a soft material. For instance, the disk 18 is made of felt. The disk 18 comprises an inside face 19, that is configured to cooperate with the peripheral edge 16 of the application device, so as to mount the disk 18 on the central portion 12 of the application device 10, and an external face 20, said external face 20 forming an application surface which usefulness will appear more clearly in the coming description.

FIGS. 3 and 4 represent a partial cross-section of the first embodiment of the application device 10 when the disk 18 is mounted on the peripheral edge 16 and when the coupling means 14 cooperate with the gripping members 104, 106 so as to mount the application device 10 in the machine 100.

The application device 10 further comprises a tank 22 that comprises a chamber 23 that is configured to contain some solution, such as a cleaning solution.

The tank 22 presents for instance a substantially cylindrical shape and has two opposed disk-shaped faces 24, 26 that are configured to face respectively each of the gripping members 104, 106 when the application device 10 is mounted in the machine 100, and a peripheral border 28 that links the faces 24, 26; for instance, the peripheral border 28 of the tank 22 forms the peripheral edge 16 of the application device 10.

As it appears in particular in FIG. 4, at least one of the faces 24, 26 of the tank 22 presents flexibility properties so that the tank 22 can be squeezed when a pressure is exerted on it.

The application device 10 further comprises delivering channels 30 that are arranged, for instance, in the peripheral border 28 of the tank 22. In other words, the delivering channels 30 are formed in the peripheral edge 16 of the application device 10. The delivering channels 30 are configured so that when a pressure is applied on the tank 22, and in particular on one of its faces 24, 26, they guide the solution that is contained in the chamber 23 of the tank 22 to the disk 18 that is mounted on the application device 10, as it is represented in particular on FIG. 4. As a result from the squeezing of the tank 22, some cleaning solution reaches the external face 20 of the disk 18.

The method according to the present invention will now be described with reference to FIGS. 6 and 7.

The method consists in providing an application device 10 having a tank 22 containing a cleaning solution, and a disk 18 mounted on its peripheral edge 16.

The application device 10 is mounted on the gripping members 104, 106.

The control means are then actuated so that the set of grinding wheels 102 is rotated around the first axis 118, whereas the application device 10 is rotated around the second axis 120.

A method in which only the set of grinding wheels 102 would be rotated in the machine 100 could of course also be conceived.

The control means are further actuated so that the application device 10 and at least one of the grinding wheels of the set 102 come into contact with each other. In particular, the control means are actuated so that the disk 18 that is mounted on the application device 10 comes into contact with at least one of the wheels of the set 102, for instance with the polishing wheel 112.

Figure 6:
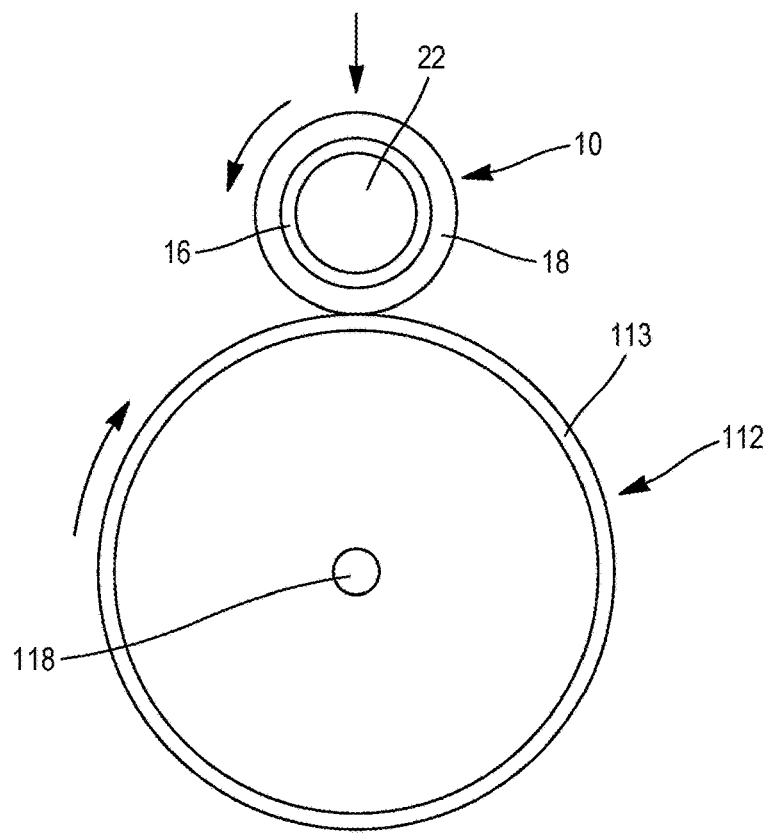
FIGS. 6 and 7 represent the main steps of the method according to the present invention.
Figure 7:
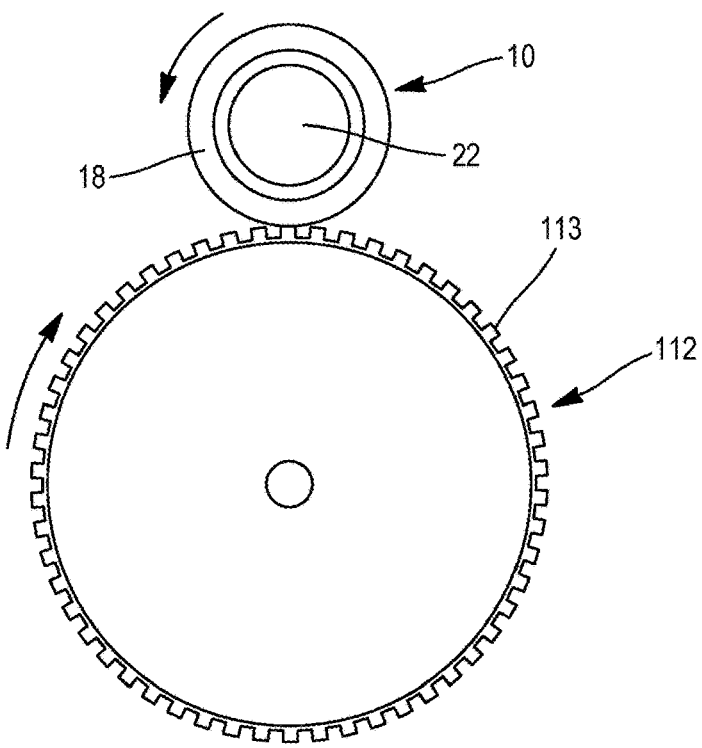

As represented in particular in FIG. 6, the grinding surface 113 of the polishing wheel is worn, the diamond particles being smooth or covered with dirt or oxidation.

The method can optionally comprise a preliminary step during which the external face 20 of the disk 18 mounted on the application device 10 is applied against the grinding surface of at least one of the wheels of the set of grinding wheels 102.

Then a pressure is exerted on the application device 10, and in particular on at least one of the faces 24, 26 of the tank 22 so as to squeeze the tank 22; the cleaning solution contained in the chamber 23 of the tank 22 is thus expelled out of the chamber 23 through the delivering channels 30 so as to reach the disk 18, and in particular its external face 20. As represented in particular in FIG. 4, some cleaning solution thus reaches the external face 20 of the disk 18.

The control means are actuated so that the application surface of the application device 10 on which some cleaning solution is disposed is applied against the grinding surface 113 of the polishing wheel 112. To do so, the set of grinding wheels 102 and/or the assembly consisting of the gripping members 104, 106 and the application device 10 are rotated around respectively the first and/or second axes 118, 120.

For surface renewal, the application device 10 and the set of grinding wheels 102 are driven in rotation and the control means ensure that the application device 10 is positioned facing the grinding wheel to be cleaned and/or renewed, by relative displacement in the direction of the axis indicated by arrow 124 in FIG. 1. Following this, the control means ensure that the application device 10 and the polishing wheel 112 move relatively one with respect to the other so that they come into contact for the period necessary to clean and/or renew the grinding surface of the polishing wheel 112. Obviously, this time will depend on the latter's composition as well as on the softness of the application surface of the application device. According to the invention, surface cleaning and/or renewal is carried out after wear of the grinding wheel has been detected. As represented in particular in FIG. 7, once the polishing wheel 112 has been renewed and/or cleaned, its particles, such as diamond particles, become sharper.

The method may further comprise a step consisting in injecting a rinsing solution, for instance water, in the machine 100 so as to rinse the machine 100, and in particular the cleaned and/or renewed surface 113 of the polishing wheel 112.

To ensure an efficient application of the cleaning solution on the grinding surface to be cleaned and/or renewed, and so that the application device 10 does not collapse when the application surface is applied against the grinding surface, the disk 18 presents a Young modulus that is smaller than the Young modulus of its central portion 12.

For instance, the disk 18 is made of felt; we can obviously imagine, without going beyond the ambit of the present invention, a disk 18 that would be made in any other material, as long as it presents capillarity, absorption and softness properties.

For instance, the disk 18 presents a density that is comprised between 200 and 1000 g/m² for a material having a 1 mm thickness, preferably comprised between 300 and 900, preferably comprised between 400 and 800.

For instance, the disk 18 presents a radial thickness comprised between 5 and 150 mm; it could present a tensile strength comprised between 30 and 80 kp/cm².

The cleaning solution may comprise an alumina-based polishing paste or an alumina-based polishing solution, or any other element presenting polishing and/or cleaning properties.

Figure 5:
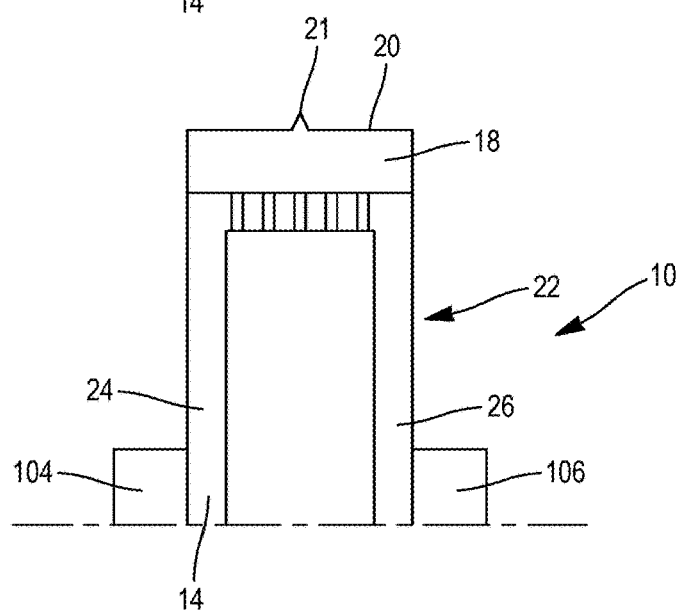
FIG. 5 represents a partial cross-section of a second embodiment of the application device.

FIG. 5 represents a second embodiment of the application device 10 of the present invention. This second embodiment distinguishes from the first one described in reference to FIGS. 3 and 4 by the fact that the application surface that is formed by the external face 20 of the disk 18 comprises a rib 21. The rib 21 is configured to cooperate with a peripheral groove 115 that is formed in the peripheral edge of the grooved wheel 114. Thus the application device 10 is conformed so as to efficiently clean and/or renew the grinding surface of the grooved wheel 114.

The two embodiments of the application device 10 of the invention comprise a squeezable tank 22 that is configured so that when pressure is exerted on a portion of the application device 10, some solution contained in the chamber 23 of the tank is guided to the application surface of the application device.

Other solution to provide some cleaning solution to the application surface of the application device could be imagined.

For instance, the disk 18 of the application device 10 could comprise some capsules containing some cleaning solution, the capsules being configured to relieve some cleaning solution when a force greater than a certain threshold is applied to them. For instance, the cleaning solution contained in the capsules could be released when the assembly consisting of the gripping members and the application device has a rotation speed around the second axis greater than a determined threshold.

Some cleaning solution could alternatively be applied to the disk 18, and in particular to its external face 20, prior to the mounting of the application device 10 in the machine 100.

In another embodiment of the process of the present invention, some cleaning solution could be applied to the disk 18 of the application device 10 once it has been mounted in the machine 100, for instance manually by the operator when the protective hood is still open.

It could also be conceived an application device having an application surface that is configured to directly cooperate with the grinding surface to be cleaned and/or renewed. For instance, the application surface comprises a soft material that is configured to clean and/or renew the grinding surface of the grinding wheel.

Although representative processes and articles have been described in detail herein, those skilled in the art will recognize that various substitutions and modifications may be made without departing from the scope of what is described and defined by the appended claims.

The invention claimed is:

1. An application device (10) configured to clean a grinding surface (113) of a grinding wheel (112) when said grinding wheel is mounted in a machine (100) for grinding ophthalmic lenses and when the machine comprises at least:
    the grinding wheel having the grinding surface (113) and being rotatably mounted in the machine around a first axis (118); and
    gripping members (104, 106) configured to receive an ophthalmic lens; and
the application device comprising:
    a central portion (12) having coupling means (14) shaped so as to cooperate with the gripping members so as to mount the application device in the grinding machine; and
    a peripheral edge (16) and a disk made of felt, wherein the disk comprises an inside face configured to cooperate with the peripheral edge of the application device, so as to mount the disk on the central portion, and
    an external face forming an application surface, so as to directly cooperate with the grinding surface of the grinding wheel so as to clean the grinding surface,
wherein the application device further comprises:
    a tank (22) that comprises a peripheral border and is configured to contain a cleaning solution; and
    delivering channels (30) that are arranged in the peripheral border of the tank and configured to guide the cleaning solution to the external face of the disk when a pressure is applied to the tank so as to squeeze the tank.

2. The application device (10) according to claim 1, wherein the delivering channels are arranged in the peripheral edge (16) of the application device.

3. The application device (10) according to claim 1, wherein the disk presents a Young modulus smaller than a Young modulus of the central portion.

4. The application device (10) according to claim 1, the grinding surface of the grinding wheel (114) having a peripheral groove (115), the application surface of the application device having a rib (21) that is configured to cooperate with the peripheral groove of the grinding surface.

5. A cleaning kit comprising:
    an application device (10) according to claim 1; and
    a cleaning solution that is configured to be provided on the external face of the disk.

6. An application device (10) of claim 1 in combination with the machine (100) for grinding ophthalmic lenses.

* * * * *